Sept. 2, 1924.  H. T. WEIS  1,507,537

VEHICLE SPRING CLIP

Filed Dec. 9, 1922

Inventor
H.T. Weis,

By
Attorney

Patented Sept. 2, 1924.

1,507,537

UNITED STATES PATENT OFFICE.

HENRY T. WEIS, OF FAIRMONT, WEST VIRGINIA.

VEHICLE-SPRING CLIP.

Application filed December 9, 1922. Serial No. 605,823.

*To all whom it may concern:*

Be it known that HENRY T. WEIS, a citizen of the United States of America, residing at Fairmont, in the county of Marion and State of West Virginia, has invented new and useful Improvements in Vehicle-Spring Clips, of which the following is a specification.

The object of the invention is to provide simple and efficient means for preventing the rattling and noisy or audible vibration of vehicle spring clips without interfering with the proper functioning of the clip or other parts of the structure with which the clip is related and in this connection to provide a device which may be applied at any time to the clip of a vehicle spring without necessitating any change in the construction of either the spring or the clip; and with these objects in view the invention consists in a construction and combination of parts of which a preferred embodiment is shown in the accompanying drawings, wherein:—

Figure 1:
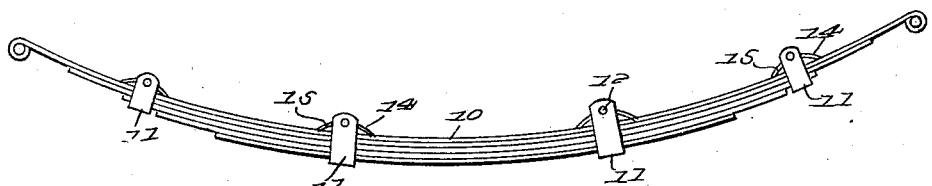
Figure 1 is a side view.
Figure 3:
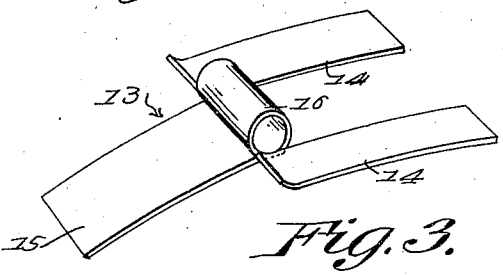
Figure 3 is a plan view of the same.
Figure 2:
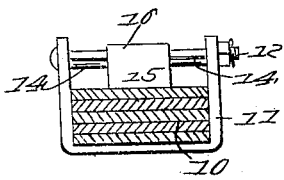
Figure 2 is an end view of a vehicle spring fitted with a clip silencer constructed in accordance with the invention.

The device embodying the invention which is applicable to a spring structure 10 having the usual clips 11 of which the sides are connected by transverse pins or bolts 12, consists of a bowed plate 13 which in the form illustrated in Figures 1 to 3 inclusive is constructed from a blank of spring or resilient metal cut away at one end to form parallel arms 14 and at the other end to form a tongue 15, of which the latter is folded or wrapped around the pin or bolt 12 to form an eye 16 with the terminal of the plate represented by the arms 14 and tongue 15 bearing upon the surface of the adjacent leaf of the spring structure so as to hold the pin or bolt and clip against vibration relative to the spring leaves without interfering with the movement of the latter with relation to the clips.

Figure 4:
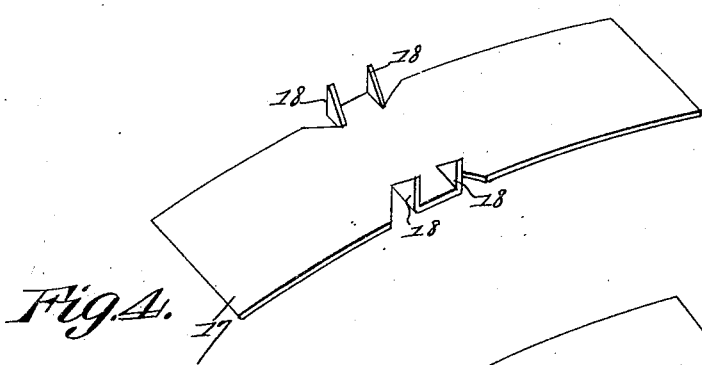
Figures 4 and 5 are detail views of modified forms of the silencer.

In the construction illustrated in Figure 4 the plate 17 bowed as described in relation to the form shown in Figures 1 to 3 inclusive is provided with triangular upstruck ears 18 which lie in contact with opposite sides of the pin or bolt 12 to position the silencer in longitudinal displacement with relation to the spring, the terminals of the blank bearing upon the exposed surface of the adjacent spring leaf.

Figure 5:
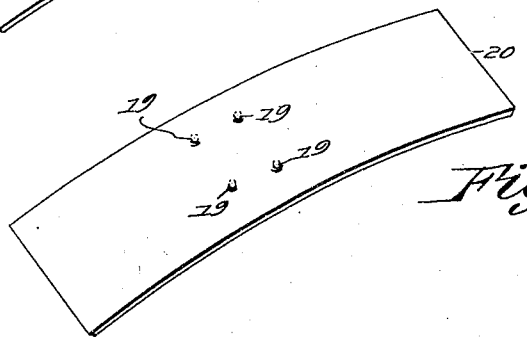

In Figure 5 the further modification illustrates silencer holding means consisting of punch points or indents 19 formed in the plate 20 in position for engagement with the opposite sides of the pin or bolt 12 to hold the device against displacement and permit of functioning as above described with relation to the other forms of the device.

The silencer is of such a construction as may readily be applied to the clips of a vehicle spring when the parts of the latter are assembled or subsequent to the assembly thereof should the structure develop a tendency to rattle or to produce an audible vibration, so that the annoyance incident to such sound may be eliminated.

Having described the invention, what is claimed as new and useful is:—

1. A silencer for use in connection with vehicle spring clips having transverse pins or bolts for connecting the side arms of the clips, the same consisting of a resilient bowed plate adapted to be interposed between the pin or bolt and the exposed surface of the adjacent spring leaf for terminal contact with the latter and having at its center a coil for embracing said pin or bolt.

2. A silencer for use in connection with vehicle spring clips having transverse pins or bolts for connecting the side arms of the clips, the same consisting of a resilient bowed plate adapted to be interposed between the pin or bolt and the exposed surface of the adjacent spring leaf for terminal contact with the latter, said plate being provided at one end with parallel arms and at the other end with a tongue of which the latter is wrapped around said pin or bolt in a plane between said arms.

In testimony whereof he affixes his signature.

HENRY T. WEIS.